United States Patent [19]

Fontana et al.

[11] Patent Number: 5,025,081

[45] Date of Patent: Jun. 18, 1991

[54] PREPARATION OF POLYESTERCARBONATE FROM ALIPHATIC DICARBOXYLIC ACID

[75] Inventors: Luca P. Fontana, Evansville; Paul W. Buckley, Mt. Vernon, both of Ind.

[73] Assignee: General Electric Company, Mt. Vernon, Ind.

[21] Appl. No.: 476,067

[22] Filed: Jan. 30, 1990

Related U.S. Application Data

[63] Continuation-in-part of Ser. No. 455,067, Dec. 22, 1989, abandoned.

[51] Int. Cl.$^5$ .............................................. C08G 63/64
[52] U.S. Cl. ..................................... 528/176; 528/182
[58] Field of Search ................................. 528/176, 182

[56] References Cited

U.S. PATENT DOCUMENTS 4,238,597 12/1980 Markezich et al. ................. 528/176

Primary Examiner—Harold D. Anderson
Attorney, Agent, or Firm—Martin B. Barancik

[57] ABSTRACT

A process for preparing a copolyestercarbonate which comprises reacting interfacially a dihydric phenol, a carbonate precursor, and a saturated aliphatic alpha omega dicarboxylic acid having from 9 to about 40 carbon atoms wherein the said diacid is from about 2 to about 20 mole percent based on the dihydric phenol reactant content and wherein the initial pH is from about 8 to about 9 for about 70 to about 95% of the carbonate precursor addition time period time period and is then raised to a final pH of from about 10 to 12 for the remainder of the carbonate precursor addition time period.

12 Claims, No Drawings

PREPARATION OF POLYESTERCARBONATE FROM ALIPHATIC DICARBOXYLIC ACID

REFERENCE TO RELATED APPLICATION

This application is a continuation-in-part of U.S. Ser. No. 455,067, filed Dec. 22 1989, now abandoned.

BACKGROUND OF THE INVENTION

Polycarbonates are well known as a tough, clear, highly impact resistant thermoplastic resin. However the polycarbonates are also possessed of a relatively high melt viscosity. Therefore in order to prepare a molded article from polycarbonate, relatively high extrusion and molding temperatures are required. Various efforts throughout the years to reduce the melt viscosity while also maintaining the desired physical properties of the polycarbonates have been attempted. These methods include the use of plasticizers, the use of aliphatic chain stoppers, reduction of molecular weight, the preparation of bisphenols having long chain aliphatic substituents and various polycarbonate copolymers as well as blends of polycarbonate with other polymers.

With respect to plasticizers, these are generally used with thermoplastics to achieve higher melt flow. However usually accompanying the plasticizer incorporation into polycarbonate compositions are undesirable features such as embrittlement and fugitive characteristics of the plasticizer.

Increased flow can be fairly readily obtained with the use of aliphatic chain stoppers, however impact resistance as measured by notched izod drops significantly. Embrittlement may also be a problem.

When utilizing a bisphenol having a lengthy aliphatic chain thereon, increases in flow can be observed. However these are usually accompanied by substantial decreases in the desirable property of impact strength. utilizing a copolyestercarbonate with an aliphatic segment, processes such as the pyridine solvent process of U.S. Pat. No. 3,169,121, have been utilized as well as processes utilizing diacid halides in an interfacial process sequence such as disclosed in U.S. Pat. No. 4,238,596 and U.S. Pat. No., 4,238,597 Additionally, high molecular weight aliphatic segments have been introduced into the polycarbonate (by interfacial methods) utilizing dicarboxylic endcapped polyisobutylene segments, see Mark and Peters U.S. Pat. No., 4,677,183 and U.S. Pat. No. 4,628,081. Additionally a method of incorporating aliphatic dicarboxylic acids into polycarbonate is disclosed in Kochanowski, U.S. Pat. No., 4,280,683 wherein in an interfacial process the diacids are reacted together with a dihydric phenol and a carbonate precursor such as phosgene.

As disclosed in the companion case filed on the same day and designated as 8CL-6888, the incorporation of aliphatic alpha omega medium chain acids of from eight to twenty carbon atoms produced copolyester-carbonates of sharply increased processability as measured by melt flow together with a property spectrum which was at least substantially similar to the usual aromatic polycarbonate. Therefore great interest has been generated in successfully synthesizing the copolyestercarbonate with the aliphatic ester segment. Although a standard interfacial process utilizing the chloride derivative of the saturated aliphatic alpha omega diacids can be employed to prepare the copolyestercarbonate the availability of the diacid chloride starting materials is a problem. Aliphatic diacid chlorides are commercially available only in limited quantities and at a very high cost. Furthermore even high purity diacid chlorides contain color contaminants which cause the final molded parts to display an unattractively high yellowness index. Therefore attention was focused on the readily available, relatively inexpensive diacid starting materials. The previously mentioned Kochanowski patent was studied. The disclosure is directed to the usage of various aliphatic dibasic acids as disclosed at column 5, lines 13 through 22 in combination with a dihydric phenol and a carbonate precursor such as phosgene in an interfacial process. According to Kochanowski at column 6, lines 24 to 31, the reaction was carried out at a pH of between about 4.5 and 8, preferably between about 5.5 and 6.5 until the dibasic acid is consumed. The pH of the reaction is then raised to a value of between 9 and 11.5 to complete the reaction. The polyestercarbonate is isolated according to standard techniques, see column 6, lines 24 through 30 of Kochanowski Experiments which followed the Kochanowski disclosure were conducted. 50% of adipic acid present as a 10 mole % reactant was incorporated within the polycarbonate backbone therefore providing a 5 mole % copolyestercarbonate. Additionally it has been discovered that the preferred pH range disclosed in Kochanowski does not bring about complete incorporation of diacids into copolyestercarbonates in a reasonable time period. The procedure of Example 6, see column 9, lines 1 to 13 of Kochanowski, discloses the preparation of an azelate containing bisphenol-A copolyestercarbonate. The azelaic acid reactant was present at 25 mole percent of the bisphenol-A. The most incorporation of azelate observed was 18 mole % following the procedure of Example 6. It is therefore clear that in many situations, the dibasic acid cannot be consumed in a practical sense. The raising of the pH therefore should not occur according to the Kochanowski disclosure. It should also be noted that Kochanowski uses a very high excess of phosgene A new process has been discovered which can about complete incorporation of aliphatic alpha omega diacids into aromatic polycarbonate backbones thereby producing a copolyestercarbonate having a predictable quantity of ester. A new pH stepwise range is followed to obtain copolyestercarbonate wherein there is essentially no detectable unreacted dicarboxylic acid which contaminates the waste product stream or the resultant polymer. The excess of phosgene employed in Kochanowski can be substantially reduced.

SUMMARY OF THE INVENTION

In accordance with the invention there is a process for preparing a copolyestercarbonate which comprises reacting interfacially a dihydric phenol, a carbonate precursor and an aliphatic alpha omega dicarboxylic acid having from 9 to about 20 carbon atoms, wherein the said diacid is from about 2 to about 20 mole percent based on the dihydric phenol reactant content and wherein the pH is from about 8 to about 9 for about 70 to about 95% of the carbonate precursor addition time and is then raised to a pH from about 10 to 12 for the remainder of the carbonate precursor addition time.

DETAILED DESCRIPTION OF THE INVENTION

The copolyestercarbonates of this invention are prepared utilizing the standard dihydric phenol and carbonate precursor. The ususal dihydric phenols useful in preparation of aromatic polycarbonates are also available here. Examples of these dihydric phenols are:

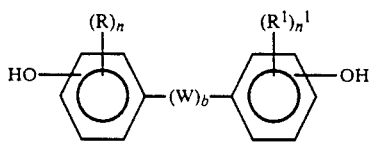

wherein
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals, —S—, —S—S—, —O—,

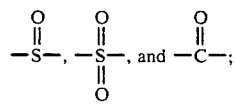

n and $^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and R are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of the Formula include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4 -dihydroxydiphenyl ether;
4,4 -thiodiphenol;
4,4 -dihydroxy-3,3 -dichlorodiphenyl ether; and
4,4 -dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors used in interfacial reaction such as phosgene, and the like. When using the interfacial process it is also standard practice to use a catalyst system well known in the synthesis of polycarbonates and copolyestercarbonates. A typical catalyst system is that of an amine system such as tertiaryamine, amidine or guanidine. Tertiaryamines are generally employed in such reactions. Trialkylmines such as triethylamine are generally preferred.

A chain terminating agent to control the molecular weight of the polymer is usually present Generally a monofunctional agent such as a carboxylic or phenol is used. Phenols are preferred. Example of such phenols include phenol, paratertiary butyl phenol, isoctylphenol, isononyl phenol, chromanyl compounds such as Chroman I and cumyl compounds such as paracumyl phenol. Quantities of chain terminating agents can range from about 0.5 to about 7 mole percent based on the dihydric phenol. The monomer which supplies the aliphatic ester units in the copolyestercarbonate is an aliphatic alpha omega dicarboxylic acid from 9 to about 20 carbon atoms. The aliphatic system is normal, branched or cyclic Examples of the system reactants include sebacic acid, dodecanedioic acid and various branched alkylene groupings. The normal aliphatic alpha omega dicarboxylic acids are preferred, generally from 9 to about 14 carbon atoms, inclusive. Saturated diacids are preferred. Dodecanedioic acid and sebacic acids are most preferred.

The stepwise pH range is critical to the process. Generally, a pH range of about 8 to 9 is maintained during the first 70-95% of the phosgenation. Preferably 75-85%. Following this period, the pH is raised to a level of about 10 0 to 12 preferably 10.2 to 11.2 wherein the remainder of the phosgenation is carried out. Generally an excess of phosgene is utilized to ensure as complete a reaction as possible. This excess is generally no more than about 30% of that necessary on a molar basis to provide complete reaction.

A preequilibration of the reactants other than phosgene at the initial reaction pH, 8 to 9, preferably 8 to 8.5, for a period of time, for example 3 to 10 minutes, seems to improve the incorporation of the diacid into the polymer. On a lab scale wherein the mixing is not as effective as in a resin reactor, dodecanedioc acid appears to incorporate better when it is used in fine particle size, for example about 50 to 300 mesh.

NON INVENTION PREPARATIONS

A. At a pH of 10 to 11 throughout the phosgenation, interfacial reactions of bisphenol-A, phosgene and various dicarboxylic acids of differing carbon chain length were attempted. The pH was controlled with sodium hydroxide The organic phase was methylene chloride. These reactions resulted in little or no incorporation of the diacids as shown by NMR. The diacids attempted to be incorporated within the polycarbonate backbone were adipic, pimelic, suberic, azelaic, sebacic, and dodecanedioic.

Example 6 of Kochanowski patent was rerun utilizing the same proportions and conditions as Kochanowski. About 18 Mol % of diacid was incorporated, as observed by $^1$H NMR.

EXAMPLE 1

Utilizing various dicarboxylic acids at a 10 mole % reactant level and following the interfacial reaction conditions described above for the invention the pH profile of the phosgenation was adjusted by phosgenating at a pH of 8 to 8.5 for 85% of the phosgenation period and then increasing the pH to 10-11 during the remainder of the phosgenation. The total time period of phosgenation was 30-35 minutes. The results are shown in the Table below The percent incorporation is based on $^1$H NMR. The Tg of the resulting polymer was measured.

TABLE I

| Acid | C | % incorp. | Tg(°C.) |
|---|---|---|---|
| Adipic | 6 | 0 | 152 |
| Pimelic | 7 | 34 | 143 |
| Suberic | 8 | 57 | 139 |
| Azelaic | 9 | 99+ | 135 |
| Sebacic | 10 | 100 | 131 |
| Dodecanedioic | 12 | 100 | 129 |

As shown by the results in the table, the shorter chain aliphatic alpha omega dicarboxylic acids were not incorporated to a great extent, if at all. Rather the first diacid which was incorporated to a substantial extent was azelaic acid. Once sebacic acid was utilized, the diacid was 100% incorporated.

EXAMPLE 2

Utilizing dodecanedioic acid and sebacic acid, the pH reliance of the interfacial reaction of the diacids as well as the time dependence of the pH level and the quantity of catalyst, were variables studied for the effect of percent incorporation of acid into the copolyestercarbonate backbone. The dihydric phenol employed was bisphenol-A. Phosgene was the carbonate source. The pH was controlled by sodium hydroxide. The organic solvent was methylene chloride. Both the dodecanedioic (DDDA) and sebacic (SA) acids were used at 10 mole percent level, based on the bisphenol-A quantity. IV is intrinsic viscosity as measured at 25° C. in methylene chloride and reported as dl/g. Mole % TEA is mole percent triethylamine based on bisphenol-A.

Below are the results:

TABLE II

| Diacid | pH profile (time period of) phosgenation) | | mol % TEA | Unreacted Diacid (%) | IV |
|---|---|---|---|---|---|
| DDDA | 8 (28%); | 11 (72%) | 1.0 | 2.7 | .53 |
| DDDA | 8 (56%); | 11 (44%) | 1.0 | 0.3 | .53 |
| DDDA | 8 (84%); | 11 (16%) | 1.0 | 0 | .54 |
| DDDA | 8 (100%); | 11 (end) | 1.0 | 0 | .56 |
| SA | 8 (28%); | 11 (72%) | 1.0 | 2.9 | .53 |
| SA | 8 (56%); | 11 (44%) | 1.0 | 0.8 | .55 |
| SA | 8 (84%); | 11 (16%) | 1.0 | 0 | .52 |

As observed from the data in Table II, in comparison with the non invention preparation data the reaction is highly pH dependent. It is also dependent upon the length of time that the phosgenation is held at the respective pH's. Even though the correct pH's are utilized, there may be significant unreacted diacids present which contaminate the waste stream if the proper pH time period is not observed.

What is claimed is:

1. A process for preparing a copolyestercarbonate which comprises reacting interfacially a dihydric phenol, a carbonate precursor, and an aliphatic alpha omega dicarboxylic acid having from 9 to about 20 carbon atoms wherein the said diacid is from about 2 to about 20 mole percent based on the dihydric phenol reactant content and wherein the initial pH is from about 8 to about 9 for about 70 to about 95% of the carbonate precursor addition time period and is then raised to a final pH of from about 10 to 12 for the remainder of the carbonate precursor addition time period.

2. The process in accordance with claim 1 wherein the dicarboxylic acid is saturated.

3. The process in accordance with claim 1 wherein the dicarboxylic acid has from 9 to about 14 carbon atoms and the carbonate precursor is phosgene.

4. The process in accordance with claim 3 wherein the dicarboxylic acid is selected from the group consisting of azelaic acid, sebacic acid and dodecanedioic acid.

5. The process in accordance with claim 4 wherein the diacid is azelaic acid.

6. The process in accordance with claim 4 wherein the diacid is sebacic acid.

7. The process in accordance with claim 4 wherein the diacid is dodecanedioic acid.

8. The process in accordance with claim 1 wherein the initial pH range is from about 8 to 8.5.

9. The process in accordance with claim 1 wherein the initial pH time period is from about 80-85%.

10. The process in accordance with claim 1 wherein the final pH is raised to a range of from about 10.5 to 11.5.

11. The process in accordance with claim 1 wherein an amine catalyst is present in quntities of from about 0.75 to about 3.0 mole percent based on the dihydric phenol.

12. The process in accordance with claim 11 wherein the catalyst is from about 1.5 to 3.0 mole percent.

* * * * *

UNITED STATES PATENT AND TRADEMARK OFFICE
CERTIFICATE OF CORRECTION

PATENT NO. : 5,025,081

DATED : June 18, 1991

INVENTOR(S) : Luca Pietro Fontana; Paul William Buckley

It is certified that error appears in the above-identified patent and that said Letters Patent is hereby corrected as shown below:

Column 4:
Line 49
Delete "100" and add "10.0"

Signed and Sealed this

Seventeenth Day of November, 1992

Attest:

DOUGLAS B. COMER

*Attesting Officer*  *Acting Commissioner of Patents and Trademarks*